Sept. 15, 1936.   J. M. LANDES   2,054,514
METHOD AND MEANS FOR FILLING CONTAINERS WITH BAKED FRUITS AND THE LIKE
Original Filed Aug. 22, 1933
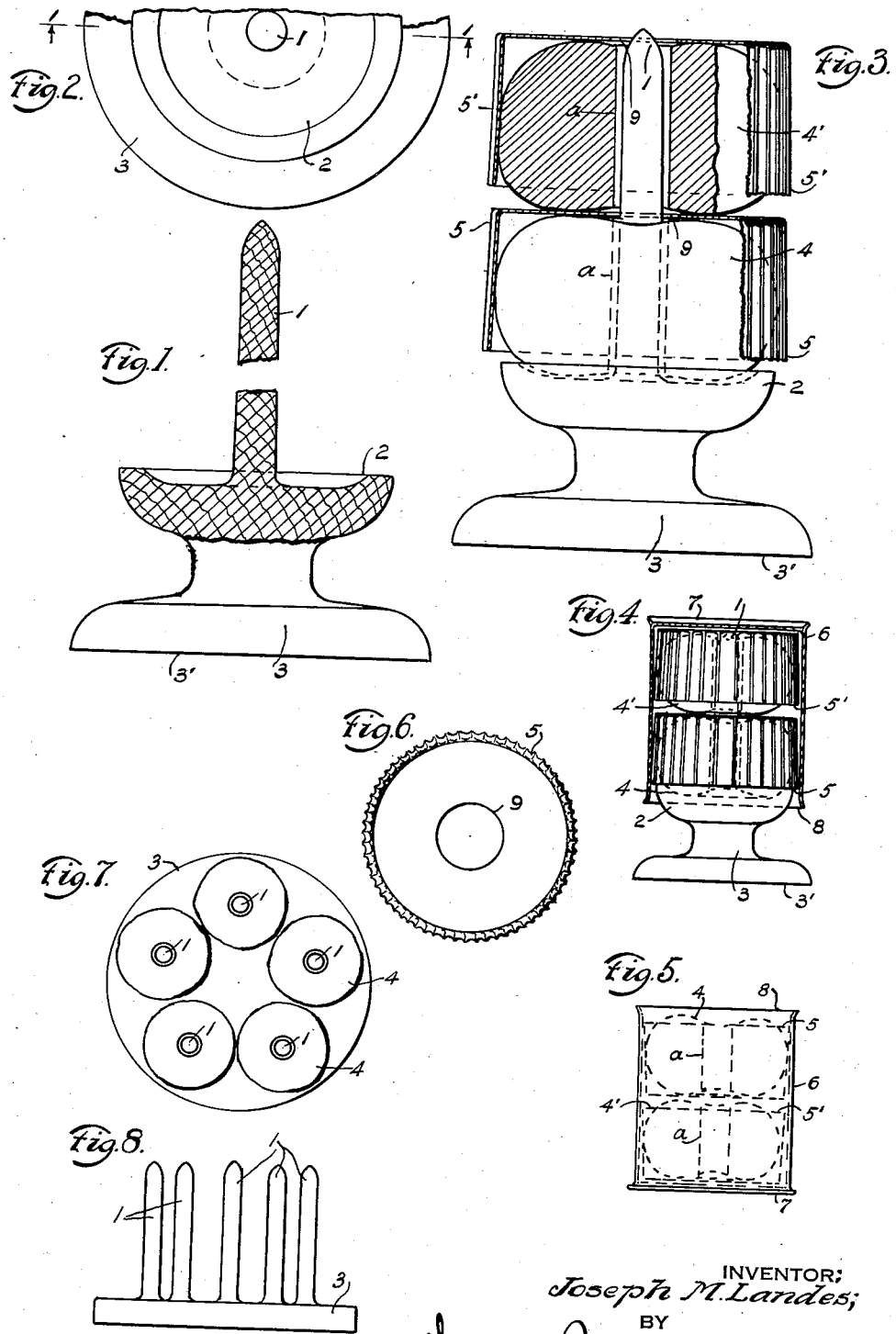
INVENTOR;
Joseph M. Landes;
BY
ATTORNEY.

Patented Sept. 15, 1936

2,054,514

UNITED STATES PATENT OFFICE 2,054,514

METHOD AND MEANS FOR FILLING CONTAINERS WITH BAKED FRUITS AND THE LIKE

Joseph M. Landes, Waynesboro, Va., assignor to The Hills Brothers Company, New York, N. Y., a corporation of New York Application August 22, 1933, Serial No. 686,257
Renewed July 24, 1936

10 Claims. (Cl. 226—18)

The present invention relates to an improvement in the method of, and means for packing baked fruits and vegetables and is more especially directed to an improvement in the art of canning baked apples, though not so limited to apples.

The present improvement, is in part, related to U. S. Patent #1,662,044, issued on March 6, 1928, to George O. Sanborn, and as hereinafter noted in detail, has to do with the method of handling the baked apples, for placing the same in cans, or similar preserving receptacles, after baking.

As is well known, properly baked apples are soft and liable to easy breaking or bruising of the skin if not handled carefully, with a consequent marring of the appearance of the baked fruit, and, sometimes the soft baked center will flow out of the broken skin, during handling, which of course compels the discarding of such injured fruit.

In order to obviate such breakage and loss, during the operation of placing the tender fruit in the cans, I have devised a loader upon which the fruit, which is cored and prebaked, before canning, may be loaded, and then transferred from the loader to the cans, without undue shocks or damage.

The foregoing and other features will be ascertained as the herein description proceeds and it is obvious that modifications may be made in the method and structures herein disclosed, without departing from the spirit hereof or the scope of the appended claims.

In the drawing,

Fig. 1 is an elevational, sectional view of the improved fruit loader, taken on line 1—1, Fig. 2, looking in the direction of the arrows;

Fig. 2 is a plan view of the device;

Fig. 3 is an enlarged view, in elevation, showing the cored and baked apples on the loader, with their surrounding individual shock absorbing paper receptacles thereon;

Fig. 4 is a view similar to Fig. 3, but reduced, and showing the open ended preserving can inverted thereover;

Fig. 5 shows the can with the fruit therein, with the open end of the can upward;

Fig. 6 is a plan view of one of the paper receptacles;

Fig. 7 discloses a modified form of loader in plan view; and

Fig. 8 is a view, in elevation of Fig. 7.

In the preparation of the apples for baking and canning, the fresh apples are sorted for size and condition. Sizing the apples is a well known operation. After sizing, the apples are cored, and are then placed in an oven for baking.

After baking the apples are removed from the oven, and are placed on the loader, which as in Fig. 1, is shown to be a base portion 3 having a wide, flat lower face 3' whereby to always be stable when loaded, and not easily tipped over.

The base portion 3 is provided with an upper, rimmed, apple-supporting platform 2, which platform, as in Fig. 2, is preferably circular, and centrally supports an upright stem 1, which is pointed at its upper end.

The loader above described may be made of any suitable material, such as wood or metal, or of a material which is not affected by the fruit juices and does not in turn affect the flavor of the fruit.

In use, after the apples have been cored and baked, as above described, an apple 4 is placed on the platform 2 of the loader, with the loader stem located in the core a, Fig. 3, then a cuplike paper receptacle 5, having a bore 9 in its bottom, Fig. 6, and having corrugated apple cushioning sides, is dropped over the loaded apple with its bottom, and bore 9, on top of the loaded apple. Then a second baked and cored apple is placed on the stem 1, to rest on the bottom of the first receptacle 5, and then a second receptacle 5' is placed, inverted on the stem 1.

As described, the loader thus holds in assembly, two baked apples, one superimposed upon the other, which are surrounded by the protective receptacles 5 and 5'. Obviously, more than two apples, by making stem 1 longer, could be positioned on the loader.

After loading as above described, the apples are ready to be placed in the cans and this is done by taking a can, having one end closed, and inverting it over the loaded apples, as in Fig. 4, and drawing the can down over the apples and receptacles.

Thereafter, the can, apples and loader are inverted together, the loader removed from the canned apples, leaving the filled can, as in Fig. 5, with its open end upward for syruping the canned fruit, and for final sealing, these latter operations being well known in this art.

In Figs. 7 and 8, there are shown two views, a plan and elevation of a modified form of loader, whereby a plurality of spaced stems 1, are erected upon a common base 3, so that a plurality of apples may be assembled for one filling of a larger type of container, the operation of loading and canning being identical with that described for Figs. 3, 4 and 5.

From the foregoing description it will be noted that the transfer of the baked apples from the baking operation to the cans is accomplished with a minimum of handling and without shock and that the assembly of the protective receptacles is accomplished simultaneously with the loading of the fruit on the loader. Thus the complete protected assembly is thus readily transferred to the can with the apples under protection of the receptacles during the can filling operation, thereby keeping the fruit in perfect condition and appearance.

Having thus described my invention what I claim is:

1. A method of canning cored and baked fruit consisting in mounting the fruit by its core in superposed relation upon a loading stem, placing the fruit in a can withdrawing the loading stem, syruping the canned fruit and then sealing the can.

2. A method of canning plural baked fruits consisting in mounting a fruit on a stem, then mounting a fruit cushioning receptacle upon said stem and about said fruit, then superimposing a second fruit upon said first fruit upon said stem and mounting a second fruit cushioning receptacle on said stem and about said second fruit.

3. A method of canning plural baked fruits consisting in mounting a fruit on a stem, then mounting a fruit cushioning receptacle upon said stem and about said fruit, then superimposing a second fruit upon said first fruit upon said stem and mounting a second fruit cushioning receptacle on said stem and about said second fruit, placing an open ended, inverted can about said fruit, then inverting the can and contained fruit, and withdrawing the said stem from the can contained fruit.

4. A method of canning plural, cored baked fruits consisting in mounting a fruit on a stem by its core, then mounting a fruit cushioning receptacle upon said stem and about said fruit, then superimposing a second fruit upon said first fruit by its core upon said stem and mounting a second fruit cushioning receptacle on said stem and about said second fruit, then placing an open ended, inverted can about said fruit, then inverting the can and contained fruit, withdrawing the said stem from the can contained fruit, syruping the fruit and then sealing the can.

5. A method of canning baked fruit consisting in mounting a cored fruit on a stem, then mounting a perforate fruit cushioning receptacle upon said stem and about said fruit, then placing an open ended, inverted receptacle about said fruit and cushion, then inverting the receptacle and contained fruit and withdrawing said stem from the receptacled fruit and cushion receptacle.

6. A method of handling perforated articles of food which are to be canned, consisting in passing a loading stem through each article thereby to mount the articles in superposed relation upon the stem and placing the articles and loading stem in a can and then withdrawing the loading stem.

7. A method of handling cored fruit consisting in mounting the fruit in superposed relation upon a loading stem, with the stem passing through the core opening; placing the fruit in a can and then withdrawing the stem.

8. A method of canning articles of food which are provided with openings consisting in mounting a plurality of the articles in superposed relation upon and all engaging with a loading stem, the stem being passed through the openings, placing the articles and loading stem in a container and then withdrawing the stem.

9. A method of handling perforated articles to be canned, consisting in mounting the articles and perforated cushion devices in superposed relation upon a loading stem the stem being passed through the openings, with the devices between the articles; placing the load in a container; and withdrawing the stem.

10. A method of canning soft, pre-baked and pre-cored fruit, which consists in loading the pre-baked, pre-cored fruit upon a loading stem, then placing the loaded stem in a can, to transfer the fruit to the can without shock, or dropping the fruit, and then withdrawing the stem from the fruit and can, leaving the fruit in the can.

JOSEPH M. LANDES.